United States Patent [19]

Schmidt

[11] 4,327,974
[45] May 4, 1982

[54] MICROFORM VIEWER

[75] Inventor: Detlef E. Schmidt, Malibu, Calif.

[73] Assignee: Topper Manufacturing Corporation, Torrance, Calif.

[21] Appl. No.: 66,935

[22] Filed: Aug. 16, 1979

Related U.S. Application Data

[63] Continuation-in-part of Ser. No. 895,514, Apr. 11, 1978, abandoned.

[51] Int. Cl.³ ............... G03B 23/08; G03B 21/30; G02B 7/04
[52] U.S. Cl. ................ 353/27 R; 350/254; 350/255; 350/257; 353/101
[58] Field of Search ........... 353/27 R, 27 A, 101; 350/254, 255, 257, 252

[56] References Cited

U.S. PATENT DOCUMENTS

| | | | |
|---|---|---|---|
| 2,552,211 | 5/1951 | Perillo | 353/101 |
| 2,949,813 | 8/1960 | Wilton et al. | 353/27 R |
| 3,070,389 | 12/1962 | Bant et al. | 350/257 |
| 3,446,552 | 5/1969 | Gross et al. | 353/27 R |
| 3,511,149 | 5/1970 | Blattner et al. | 350/255 |
| 3,572,905 | 3/1971 | Schlapp et al. | 350/257 |
| 3,814,514 | 6/1974 | Douglas et al. | 353/27 R |
| 3,838,916 | 10/1974 | Gawin et al. | 353/27 R |
| 3,899,246 | 8/1975 | Edelstein | 353/27 R |
| 3,917,389 | 11/1975 | Shoji | 353/101 |
| 3,941,467 | 3/1976 | Kapany et al. | 353/27 R |
| 4,067,648 | 1/1978 | Spreitzer | 353/27 R |

Primary Examiner—Steven L. Stephan
Attorney, Agent, or Firm—Gausewitz, Carr, Rothenberg & Edwards

[57] ABSTRACT

A portable microform viewer provides a short film path through a film transporter that adjustably positions the film in two directions by means of a pair of concentric knobs. A pair of projecting lenses is shiftably mounted for selection of one or the other and the two are mounted on a common pivoted focusing plate. Film is positioned within the film transport by means of a pair of glass flats that are detachably mounted in the transport and flexibly connected to each other for accommodation of microform of different thickness and for ready removal and complete cleaning.

37 Claims, 11 Drawing Figures

MICROFORM VIEWER

This application is a continuation-in-part of application Ser. No. 895,514 for Microform Viewer filed Apr. 11, 1978, now abandoned.

BACKGROUND OF THE INVENTION

This invention relates to microform viewers and more particularly concerns a viewer having improved film handling and image projection.

Microform viewers, for use with microfiche, roll film, film strip, aperture cards and the like, generally comprise a source of illumination, a film transport for positioning the film relative to the illumination source, a screen, and a lens system for projecting an image of the illuminated film upon the screen. Prior viewers, particularly those of a sufficiently small size for easy portability, have suffered from a number of inconveniences and deficiencies in operation. For example, although motion of the film in one direction is controlled by turning a knob, a second direction of shifting of the film has required a lateral shifting of a control. For a small lightweight viewer, this shifting mode may require use of two hands—one to move the transporter control and the other to hold the viewer case—in making this adjustment. This adjustment is thus difficult and at best inconvenient since the operator who may be making a sales presentation or taking notes of the display generally has but one hand conveniently available for operation of the viewer.

Glass flats that maintain position of the film in the focal plane of the projecting lens have not been readily accessible heretofore for cleaning. In various prior art arrangements, either the outside surfaces or the inside surfaces have been accessible. However, access to both outer and inner surfaces has not been readily available in prior machines, nor have such machines been able to accept microforms of different thicknesses.

Where dual lenses have been employed in the past, these could be changed or shifted to and from operating position only by manipulating elements within the viewer case and could not be shifted from the outside. Further, no simple procedure for focusing one or the other of a pair of projecting lenses was previously available. Dual lenses are employed because different microforms having different size and spacing of images require different magnifications. If indexing is employed it should be capable of handling more than one size and spacing of the film images.

These and other problems of prior viewers significantly detract from their convenience, utility and desirability. Accordingly, it is an object of the present invention to provide a microform viewer that eliminates or minimizes above-described disadvantages.

SUMMARY OF THE INVENTION

In carrying out principles of the present invention in accordance with a preferred embodiment thereof, an improved film transporter for a viewer is provided with a pair of concentric shafts capable of driving film through the transporter and driving the transporter itself in a second direction. A feature of the transporter is a pair of elongated glass flats adapted to receive and position the film with respect to a projection lens system, the flats being detachably mounted to and within the transporter frame and flexibly connected to each other for accommodation of microform of different thicknesses and for removal and replacement as a unit.

Another feature of the invention is an improved shiftable mounting of a plurality of lenses upon a lens carrier to selectively position a chosen one of the lenses for projection of an illuminated portion of the film. A further feature of the invention embodies a lens focus plate having a movable portion connected to a fixed portion by means of a relieved hinge portion to permit pivotal motion of the movable portion and lenses carried thereof. Each lens, being pressed against a stop on the lens focus plate, is held in precise position of focus.

Still other features of the invention include a transporter arrangement that provides a very short path for film through the viewer and the arrangement of the viewer case that permits a detachably connected battery package to provide a pedestal support for the viewer.

DETAILED DESCRIPTION

As illustrated in FIGS. 1, 2, 3 and 4, a portable viewer embodying principles of the present invention in a presently preferred configuration, comprises a substantially rigid viewer case having a top wall 10 with a carrying handle 11 thereon, a bottom wall 12, and end walls 14 and 16. End wall 14 has a recess 15 to accommodate control knobs to be described below.

A substantially rectangular front case frame 18 extends completely around the case, being discontinuous only at recess 15 of the viewer case end wall 14, and is a detachable snap fit over the front of the case. The frame includes a front panel section 20 having an inwardly pivoted door 21 mounted in a panel opening 22 that provides access to the viewer case for storage of a transformer (not shown).

Figure 1:
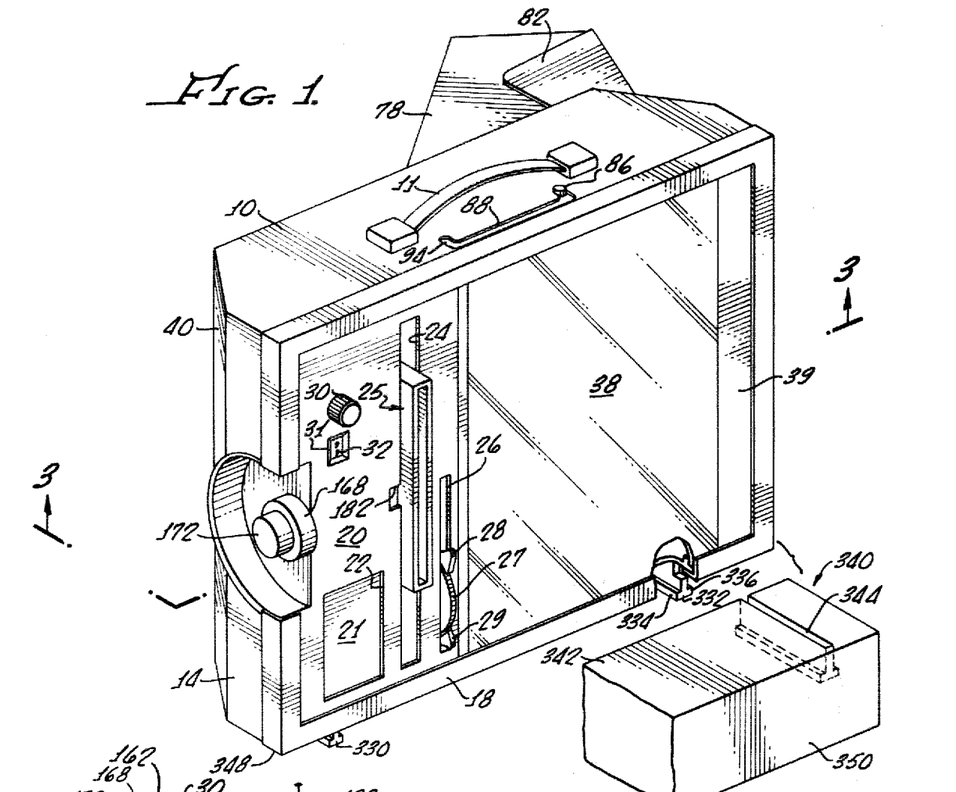
FIG. 1 is a perspective view of a portable viewer embodying principles of the present invention.
Figure 2:
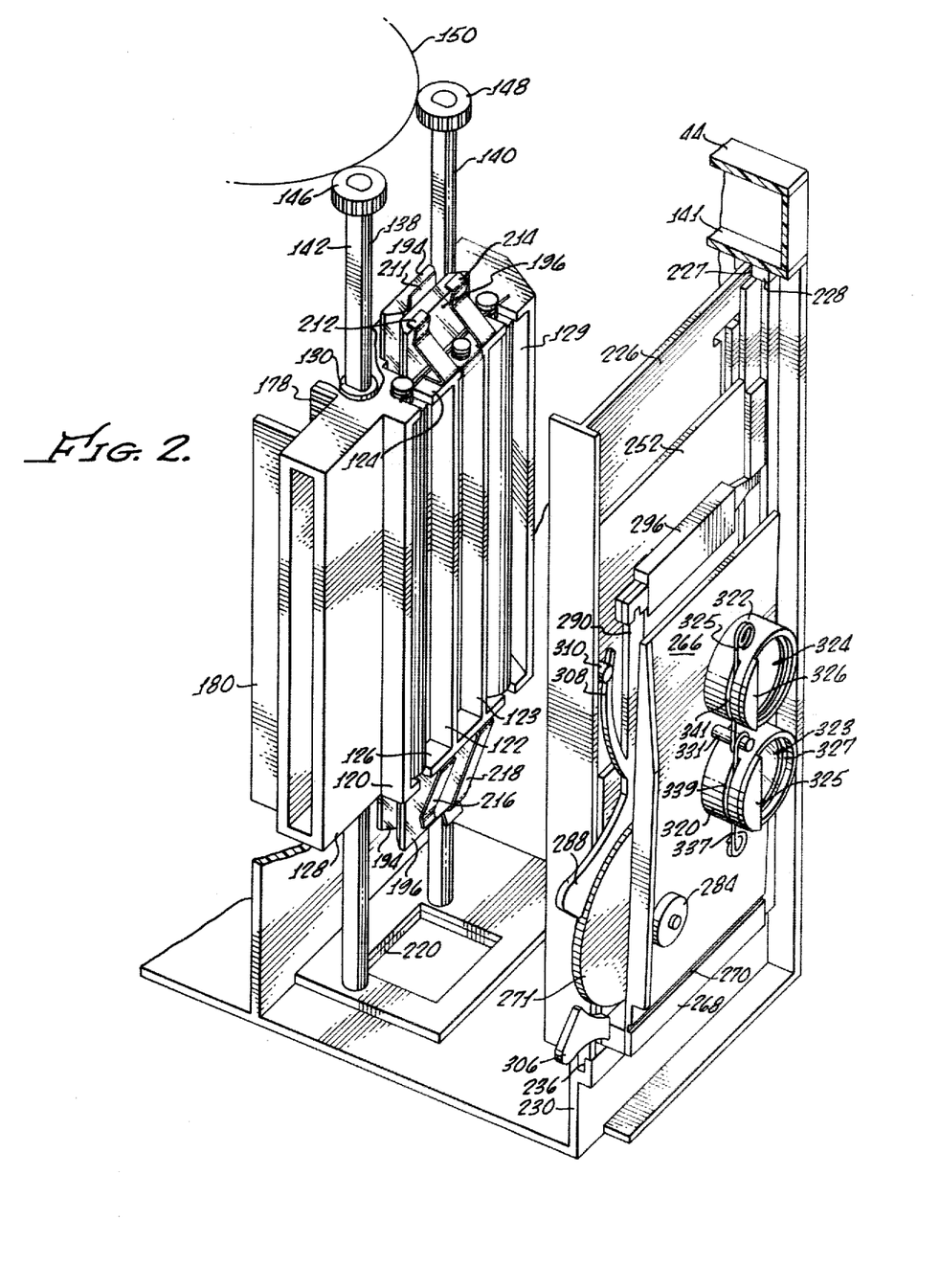
FIG. 2 is a pictorial illustration, with parts broken away, and parts removed, showing the arrangement of major operating subsystems of the viewer.
Figure 3:
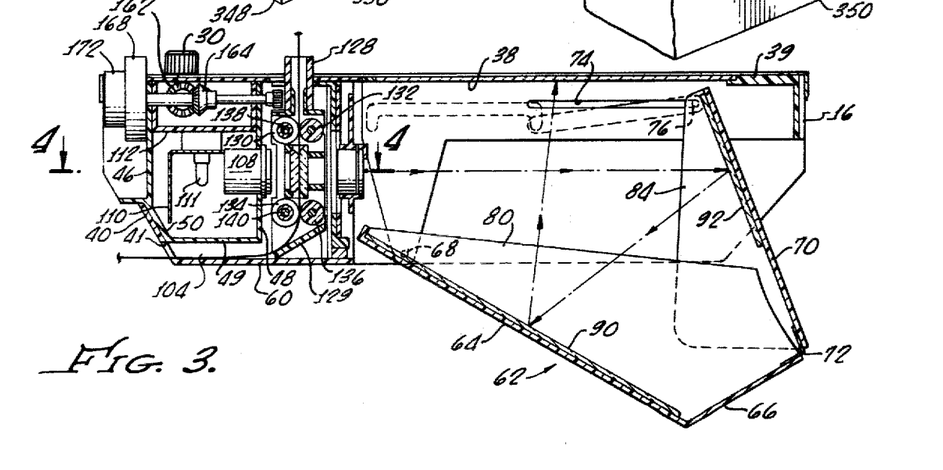
FIG. 3 is a section of the viewer taken on lines 3—3 of FIG. 1.

Front panel section 20 is formed with a vertically elongated aperture 24, through which projects a front portion of a film transporter 25, and a second shorter and narrower vertically elongated aperture 26 through which projects portions of a focusing wheel 27 and lens shifting tabs 28, 29 which flank the wheel 27. The panel also has an indexing knob 30 above an index window 31 through which an index or film position display wheel 32 may be viewed. A transparent display screen 38 is positioned in rebated forwardly facing edges of the viewer case walls 10 and 12 and a similarly rebated section of a front angled section 39 of end wall 16, the screen being held firmly in place by the front case frame 18. Suitable latching means (not shown) may be provided to detachably secure the frame 18 to the viewer case. End wall 14 includes a rear section 40 that inclines rearwardly and inwardly and is formed with a vertically elongated slot 41 that provides an exit aperture for film passed through the transporter 25.

Slidably received within and removable from the viewer case adjacent end wall 14 is a control unit case having a top wall 44, bottom wall 45 and an end wall 46 formed with a control knob receiving recess 47 that mates with recess 15 of the viewer case end wall 14. The control unit case also includes a full length vertically extending lateral wall 48 and a back wall 49 connected to the end wall 46 by sloping wall portions 50.

The viewer case has a fixed rear wall section 60 and a movable rear section 62 comprising a back wall 64 and a movable end wall section 66 fixed thereto. Sections 64 and 66 are pivoted to the top and bottom of the case about a vertical axis on pivots indicated at 68 in FIG. 3. A movable front mirror wall 70 is pivotally connected to end wall section 66 by hinges 72 and carries a mirror operating link 74 pivoted thereto about the vertical axis of a pivot 76.

The movable back and end wall sections 64, 66 have top and bottom sections 78, 80 fixed thereto and the movable front mirror wall section 70 has similar top and bottom sections 82, 84 fixed thereto, providing top and bottom closures for the light path during viewer operation.

Link 74 carries on its free end an upwardly projecting pin 86 that rides in a short legged U-shaped slot 88 formed in the case top wall 10. Back section 64 carries a reflecting mirror 90 and movable front wall 70 carries a mirror 92. This arrangement provides a compact mirror package that affords a relatively long optical path when the mirrors are moved to the operating position shown in FIG. 3. The movable wall sections 64, 66 and 70, together with the mirrors carried thereby, are movable between the operating position shown in FIG. 3 in solid lines and a folded compact position shown in dotted lines in FIG. 3, wherein the front wall section 70 lies closely adjacent the screen 38, the back wall section 64 forms a planar extension of fixed back wall 60, end wall 66 forms a planar extension of fixed end wall section 16 and pin 86 is positioned in leg 94 of the slot 88. A tension spring (not shown) is connected between pin 86 and the rear of the viewer case top wall to urge pin 86 into leg 94 of slot 88 when the movable wall sections are folded for transport of the viewer.

With the detachable control unit case in operating position within the viewer case, the control unit back wall 49 is parallel to and spaced from rear wall 60 of the viewer case to provide a film exit passageway 104 therebetween. Mounted to and projecting through the lateral wall 48 is a fixed collimating lens 108. A lamp support 110, carrying a lamp 111, is mounted to a transverse panel 112 connected to and between control unit case walls 46, 48.

A lower portion of the control unit case panel 112 is formed with a plurality of apertures behind the rectangular opening 22 formed in the front wall 20 of the front frame 18. The apertures receive for storage the prongs of a transformer (not shown) which is adapted to plug into a wall socket and which includes an electric line adapted to be connected to a socket (not shown) mounted to the viewer case and connected to carry operating current for the lamp.

The film transporter 25 is basically formed of a rectangular frame having a vertically extending front wall 120 and intermediate ribs 122, 123 parallel thereto, all interconnected by top and bottom walls 124, 126, and having a forwardly projecting rectangular film guide 128 fixed to the front wall 120 in registration with an elongated rectangular aperture formed in the transport front wall 120. A vertically extending film deflector 129 is fixed to and extends between upper and lower transporter frame walls 124, 126, lying in a plane of about 40°–60° to the plane of the film within the transporter film guide 128.

A forward pair of film drive rollers 130, 132 is captured within the transporter frame between the top and bottom walls thereof, and a rear pair of film drive rollers 134, 136 is similarly captured between the top and bottom walls of the transporter frame. Rollers 132, 1136 of the two roller pairs are journalled in the top and bottom walls of the transporter frame. Rollers 130, 134 are mounted upon first and second roller drive shafts 138, 140 respectively, which extend vertically from top to bottom of the control unit case and are journalled at the ends thereof in the bottom wall 45 and in an upper wall 141 that cooperates with top wall 44 to form a gear compartment 143. Rollers 130 and 134 are slidably but nonrotatably mounted upon their respective shafts by means of a flat surface on the shaft and a corresponding noncircular bore in the roller. The axes of rollers 130 and 132 are relatively spaced so that the drive surfaces are in contact or substantially in contact with one another to allow a film to be passed therebetween and to provide sufficient frictional drive to forceably feed a film in one direction or another as the driving roller 130 is rotated. The rollers 134 and 136 are similarly spaced and driven.

Rather than form drive rollers 130, 134 as a continuous rubber cylinder for frictional engagement with the film, a less expensive and more effective drive is employed. Rollers 130 and 134 are each formed as a smooth thin cylindrical sleeve slidable and nonrotatable on its shaft 138, 140. Each sleeve has a plurality of longitudinally spaced circumferential grooves, such as groove 131, formed in its outer surface. Each groove fixedly seats and captures a resilient drive wheel 133a, 133b, 133c and 133d (for roller sleeve 134) of rubber or the like, having a pair of circumferential film contacting drive ribs.

Figure 6:
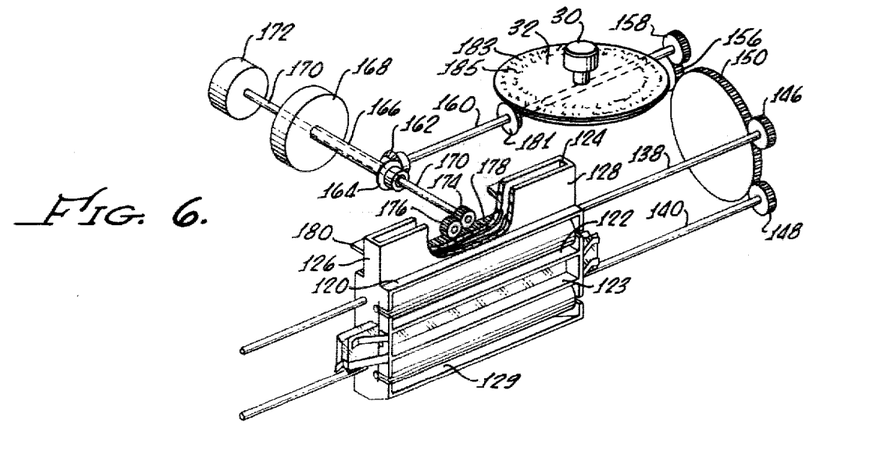
FIG. 6 is a partly schematic perspective illustration of the film transporter and its coaxial drive.

Shafts 138 and 140 (FIG. 6) fixedly carry at their upper ends gears 146, 148, both meshing with a larger gear 150 which is journalled in compartment 143. Also journalled in compartment 143 are a gear 156, meshing with gear 150, and a gear 158 in driving engagement with gear 156 and fixed to the upper end of a roller control shaft 160.

Roller control shaft 160 extends vertically downwardly and carries at its lower end a bevel gear 162 which meshes with a bevel gear 164 at right angles thereto. Gear 164 is fixed to a film drive sleeve 166 having a film operating knob 168 fixed thereto. Drive sleeve 166 is concentric with and journalled upon a transporter drive shaft 170 which is journalled in the control unit case end wall 46 and has a transporter operating knob 172 fixed to an outer end thereof. The inner end of shaft 170 fixedly carries a gear 174 which meshes with a gear 176 journalled in the lateral wall 48 of the control unit case. Gear 176 meshes with a toothed rack 178 extending vertically along the forward surface of transporter case front wall 120.

The gearing is arranged to cause the driven elements, the transporter itself on the one hand and the film on the other, to move in the same direction as the respective operating knobs are moved. Thus, if the forward side of transporter knob 172 is moved downwardly (the knob is rotated in a clockwise direction as viewed from the end of the casing having the knobs thereon), the transporter itself is moved downwardly because of the particular gearing. Similarly, when the upper surface of knob 168 is moved to the rear (the knob is rotated in a counter-clockwise direction), film captured between the rollers of each pair is moved rearwardly. Thus, the controls are still further simplified. The two concentric film control knobs facilitate one handed operation by an operator taking notes with his right hand and simplify operation of both knobs while looking at the display and not the knobs.

A vertically extending index flange 180 is fixed to and extends laterally of one side of the transporter frame guide 128 (FIG. 2) at a position forward of the gears 174, 176 and cooperates with an index window 182 formed as a lateral recess at a mid-point of the transporter slot 24 of frame panel 20. Suitable indicia are imprinted upon the forwardly facing surface of the index flange 180 so that film row position may be displayed as the transporter frame is adjusted upwardly or downwardly.

Figure 5:
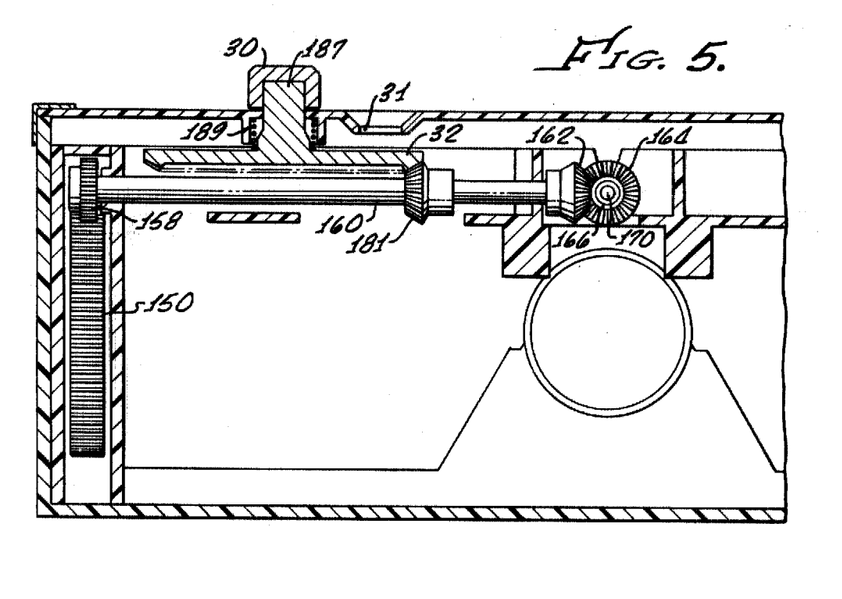
FIG. 5 is a section showing the dual indexing.

Column indexing (display of film horizontal position) is provided by a gear 181 fixed to shaft 160 and meshing with the toothed beveled edge of circular index display wheel 32 that bears two circular arrays 183, 185 of column indexing indicia, both of which are visible through window 31 (FIG. 1). Wheel 32 (FIG. 5) has a fixed hub 187 extending axially of the wheel through the case wall 20, column indexing knob 30 being fixed to the outwardly projecting end of the hub. A spring 189 encircles the wheel hub and is compressed between the wheel and case wall to urge the wheel into engagement with gear 181. The wheel, which is rotated by gear 181 (and thus by knob 168), may be set at any selected index position merely by pulling (or tilting) knob 30 so as to disengage the wheel from gear 181 and rotating the knob, while the wheel is so disengaged, until the desired character appears in window 31.

The upper and lower transporter frame walls 124, 126 are formed with openings 190, 192 that slidably receive and laterally position a pair of film positioning elongated glass plates or flats 194, 196 that extend downwardly through the interior of the transporter frame. Openings 190, 192 are dimensioned so as to position the two flats 194, 196 in close proximity to one another, being sufficiently close to receive and firmly position a film interposed therebetween. The flats (FIG. 7) are precisely spaced from one another (at a minimum spacing) by spacer strips 200, 202 fixed to flat 196 (but not to the other flat) at opposite ends thereof. The forward and rearward edges of both flats at the inner surfaces thereof are beveled as indicated in the drawings to facilitate insertion of a film therebetween.

Figure 7:
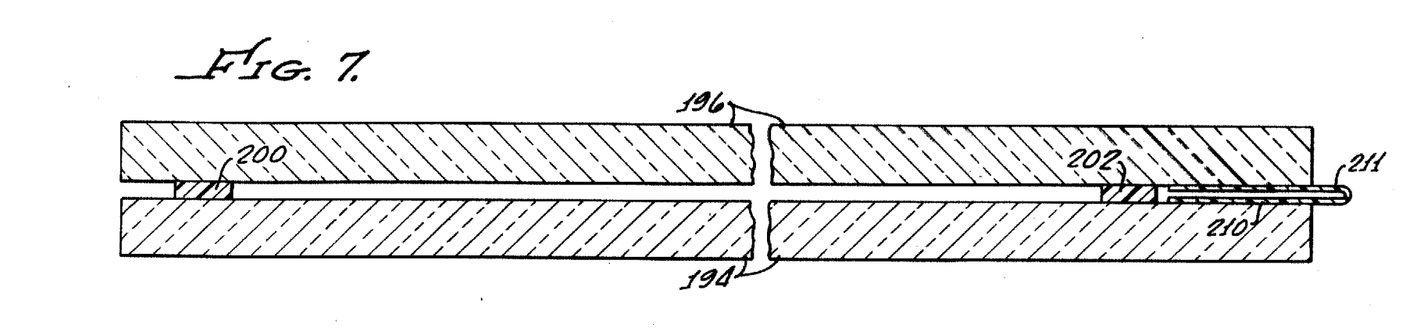
FIG. 7 is an enlarged view showing parts of the glass flats and their flexible and expandable hinge.

A thin flexible strip, such as a plastic strip 210, is cemented to the flats 194, 196 at the upper ends of the flats to provide a flexible and expandable hinged connection therebetween. The strip is illustrated as being cemented to facing inner surfaces of the flats. It may also be cemented or otherwise secured to outer surfaces, end surfaces, or both. Strip 210 has an extended loop portion 211 that permits the flats to be displaced from each other to accommodate microform of increased thickness, such as those film elements having a plastic or cardboard frame. This loop portion, having an unsecured length greater than the distance between the flats when in their minimum spacing, makes the hinge expansible. Other expandable connections may be employed.

First and second pairs of spring fingers 212, 214, 216, 218 are fixed to top and bottom walls of the transporter frame and have bent ends extending inwardly against both the outer surface and the end edges (except for finger 216) of flat 196 to press this flat and, thereby both flats, laterally against sides of frame openings 190, 192 to hold the flats in position and restrain accidental displacement. Finger 216 does not extend over the flat edge to facilitate removal of the flats.

The flats 194, 196 are not otherwise (other than by the restraint of the spring fingers) secured to the transporter frame and thus when the latter is moved to a lower position, the lower ends of the two flats are accessible through an aperture 220 in the control unit case bottom wall (after the control unit case has been removed from the viewer case). The lower spring fringer 218 may then be displaced and the flats may be grasped by the operator's fingers to slidably removed the flats as a unit from the transporter frame. Once completely removed from the viewer, the two flats may be displaced from one another about their pivotal connection, at the flexible hinge 210, and both surfaces of both flats are thus readily accessible for cleaning. It is a simple matter to replace the flats. One simply pivots the two into juxtaposition with the two inner faces thereof in near contact, spaced by spacers 200, 202. The upper (hinged) ends of the two flats are inserted through the control unit case aperture 220 and thence through the apertures 192, 190 in the transporter frame walls until the upper end of flat 196 seats upon the bent ends of spring fingers 212, 214.

Spacers 200, 202 hold the flats spaced to receive a relatively thin microform. Insertion of a thicker microform (one having a frame or holder, for example) increases the spacing between the flats, such increase being accommodated by the flexible, expandable hinge strip 210 and the spring fingers. The arrangement permits the glass flats to remain parallel to each other, contacting opposite sides of the interposed film, as their mutual spacing is changed.

Figure 8:
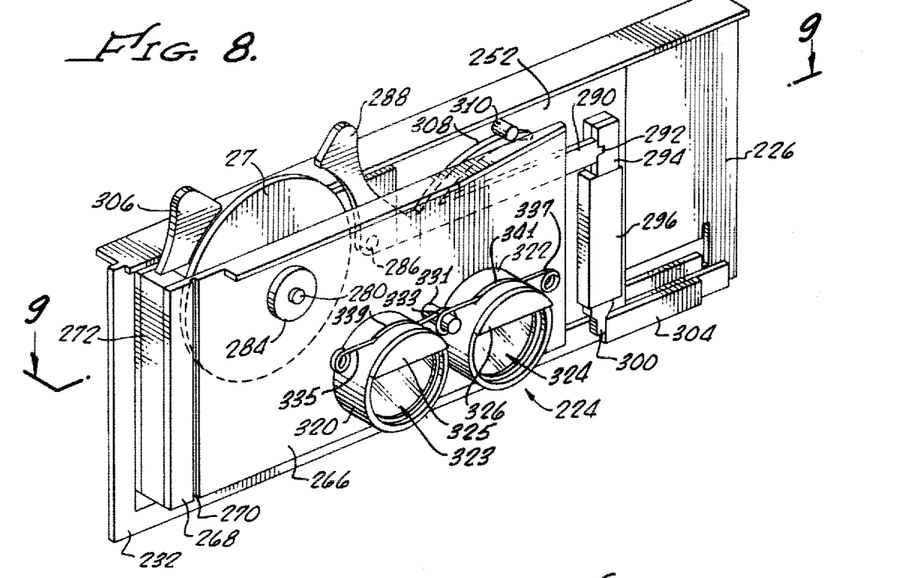
FIG. 8 is a perspective view of the lens carrier assembly.
Figure 9:
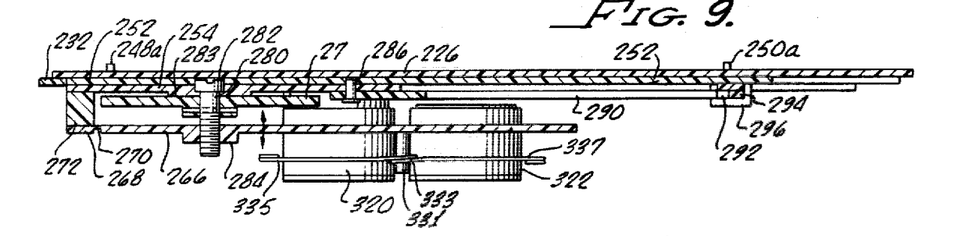
FIG. 9 is a section taken on lines 9—9 of FIG. 8.
Figure 10:
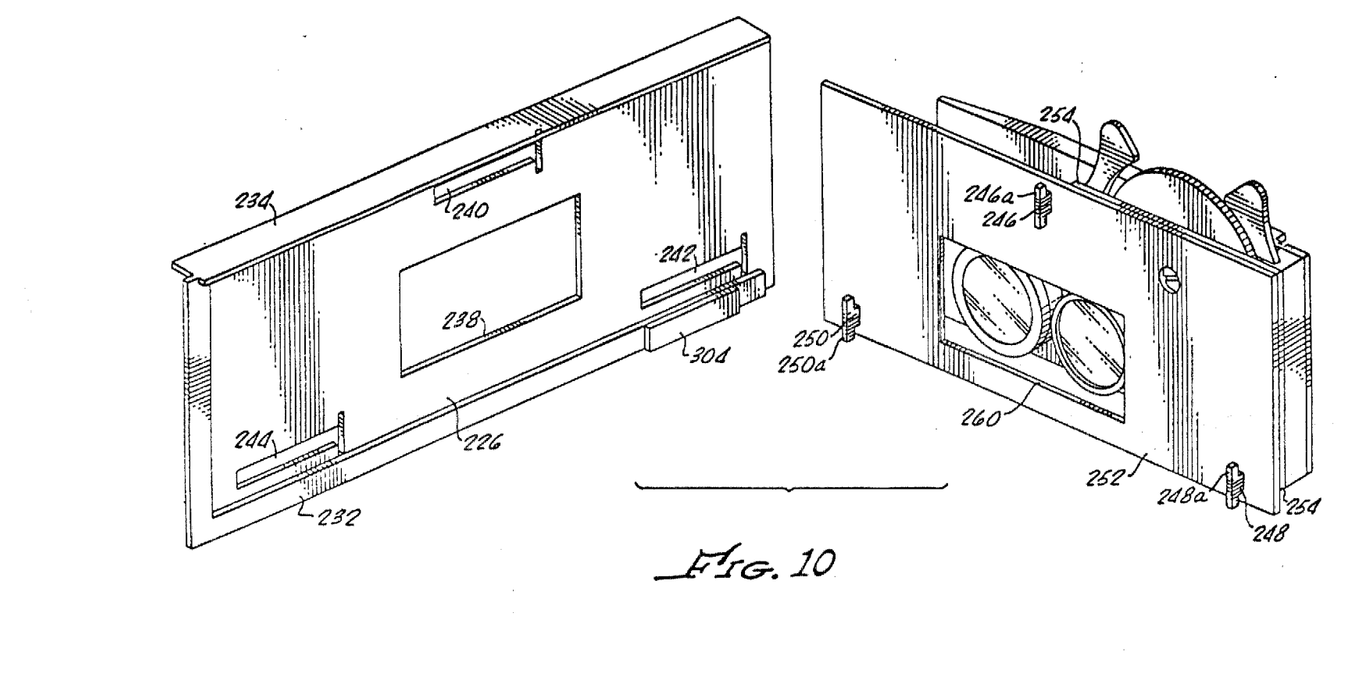
FIG. 10 is a partly exploded perspective of the lens carrier assembly of FIG. 8.

A lens carrier assembly 224 (FIG. 8) is formed of a support plate 226 removably mounted in the control unit case by reception of an upper end thereof in a downwardly facing channel 227 (FIG. 4) of a support rib 228 projecting downwardly from and fixed to the control unit case wall 141. At its lower end the support plate has a shoulder 229 that abuts against the upper edge of a rib 230 fixed to the bottom wall 45 of the case. Lower and rear edges of plate 226 are reinforced by an L-shaped guide strip 232 fixed to the plate and overlapping its bottom and rear edges, and a front guide strip 234 is fixed to its front end. The lower end of guide strip 232 extends into slidable engagement with an upwardly facing channel 236 formed in rib 230. A substantially centrally positioned vertically elongated rectangular aperture 238 (FIG. 10) is formed in plate 226 to pass light to one or the other of the projection lenses (described below). Also formed in the plate are a plurality (three in the illustrated embodiment) of T-shaped vertically extending slots or guides 240, 242, 244 which slidably receive and constrain a like number or similarly positioned shift plate guides or followers 246, 248 and 250 that are fixed to and project from a lens change shift plate 252. The T-shaped followers 246, 248, 250 have laterally extending legs 246a, 248a, 250a that allow assembly of the shift plate to the support plate by inserting these legs through the laterally elongated ends of the guides 240, 242, and 244. After such insertion, relative sliding motion of the two plates causes the lateral projecting ends of the followers to be captured to and within the narrower vertical portions of the guide slots 240-244.

Lens change shift plate 252 has an area of double thickness, being reinforced by an adhesively connected L-shaped plate element 254 that extends along front and lower edges of the shift plate. A rectangular aperture 260 is formed in the shift plate to permit the system projection lenses to extend therethrough.

The lens change shift plate, which is thus vertically slidable as a unit relative to the relatively fixed lens carrier support plate 226, carries a lens focus plate having a movable section 266 and a relatively fixed section 268, the two being integrally connected by a relieved flexible section 270 which provides a flexible hinge that mounts the movable section 266 to the fixed section 268. Fixed section 268 is fixed to the reinforced portion of shift plate 252 by being fixedly connected to a spacer bar 272 which in turn is fixed to the shift plate element 254. A bolt 280 has its head 282 received in a recess formed in the shift plate 252 and in a mating recess of a thickened portion 283 of plate element 254. The bolt is captured therein by abutment with the surface of the support plate 226. A threaded shank of bolt 280 is threadedly engaged in an aperture formed in a boss 284 on the movable section 266 of the lens focus plate. Fixed to the shank of the bolt 280, as by pinning or a press fit or the like, is the focus wheel 27 which has a knurled outer edge for facilitating turning the wheel by the finger of an operator. Turning of wheel 27 turns the bolt 280 and shifts the bolt axially of the hub 284 to cause the movable focus plate section 266 to pivot about its hinge 270.

Journalled in the shift plate 252 upon a pin 286 is a bell crank latch-operating lever having an operating arm 288 and an actuating arm 290. Actuating arm 290 extends vertically upwardly and has a tongue 292 projecting upwardly therefrom and captured in a mating recess formed in a shift plate latch bar 294 that is horizontally slidable in a U-shaped guide 296 fixed to and laterally projecting from the shift plate 252.

Shift plate latch bar 294 has a rearwardly projecting tongue 300 adapted to engage upper or lower ends of a latch stop 304 fixed to an upper portion of the rearward edge of guide strip 232 of the support plate 226. A fixed thumb tab 306 is attached to spacer bar 272 and provides a reaction member for fingers of the operator's hand that are used to press the latch-operating lever arm 288 and pivot this downwardly about its pivot 286. Thus, as the two opposed finger elements 288 and 306 are grasped in one hand, the bell crank lever is rotated to move latch 294 forwardly whereby shift plate 226 and the entire shiftable lens assembly may be moved upwardly until the latch tongue 300 clears the upper end of latch stop 304, whereupon the bell crank is pivoted to drive the latch 294 rearwardly into engagement with the upper end of the stop 304. Thus, the entire lens assembly which has been slidably adjusted upwardly is positioned in the uppermost of its two positions. A spring in the form of an arcuate resilient arm 308 integral with the bell crank engages, on its forward convex side, a pin 310 fixed to lens change shift plate 252 to resiliently urge the bell crank to its illustrated latching position.

First and second lens supports in the form of tubes or cylinders 320, 322 are fixedly mounted to the movable section 266 of the lens focus plate. Lens assemblies 323, 324 are slidably and rotatably (but snugly) mounted in the tubes 320, 322 respectively and positioned to receive light passing through the aperture 260 of the shift plate 252. The lenses are preferably of different magnifications so that, for example, one may be used for normal viewing of relatively large areas of the illuminated film at one magnification and the other may be used for viewing of smaller portions of such illuminated area of film at greater magnification. This enables the viewer to be used with different film of different image sizes.

The focal lens position, that is, position of each lens axially of the support tubes, is critical for obtaining a clear image. Since the two lenses are mounted on the same movable focus plate, it is important that the axial position of each relative to the plate remain fixed. Individual and separate focusing of the respective lenses is not employed in normal operation of this viewer since focusing is achieved by shifting of the lens focus plate. Any axial shifting of one or the other of the lenses relative to the lens focus plate is undesirable and may result in significant focusing difficulties. To maintain such fixed lens positioning, the lenses are resiliently urged axially against stops formed by light shield segments fixed to the movable section of the lens focus plate.

Each fixed lens support tube 320, 322 is provided at its free end with a fixed light shield 325, 326 in the form of a circular segment positioned to partially block light transmitted through the lens assemblies. These fixed shields block light transmitted from the lens assembly directly to the viewing screen 38 (upwardly from the lenses as viewed in FIG. 3, for example). The shields minimize unwanted images that may be observed on the screen 38 by a person standing to one side of the screen.

Figure 11:
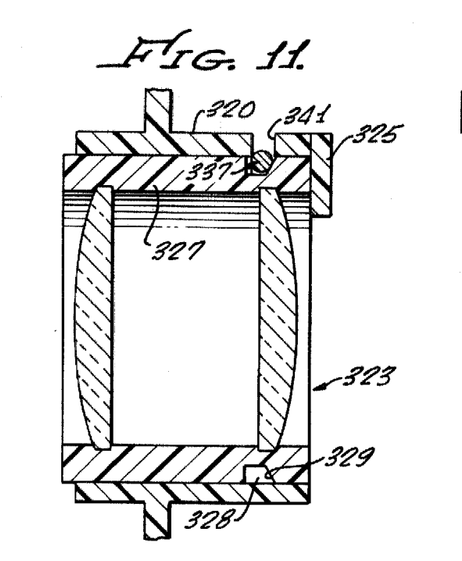
FIG. 11 illustrates details of a lens mounting.

In addition to this shielding and reflection blocking function, the fixed segments 325, 326 act as stops against which the slidable lens assemblies 323, 324 are resiliently urged. Except for their different magnifications, the two lens assemblies are identical. Lens assembly 323, for example, includes a lens sleeve 327 (FIG. 11) that carries the lens elements. Formed in the outer surface of the sleeve 327 and extending entirely circumferentially around the sleeve adjacent the forward end thereof is a slot 328 having a forward surface 329 that is inclined axially (forwardly) and radially outwardly. This provides a cam surface. A pin 331 (FIG. 8) fixed to lens focus plate portion 266 carries a spring 333 having a midportion bent around the pin, and thus captured thereon. The spring has upwardly and downwardly extending resilient legs 335, 337 which extend respectively into and through transversely extending slots 339, 341 formed in forward portions of the fixed lens support tubes 320, 322 respectively. Spring arms 335, 337 extend through the support tube slots and, because of their resilience and normal unstressed configuration, press radially against the lens sleeves. More specifically, the spring arms press radially inwardly against the forward inclined or cam surfaces of 329 of the lens sleeves. Such radially inward pressure against the inclined surfaces 329 urges the entire lens sleeve forwardly against the associated fixed shield or lens stop, such as stop 325 for tube 320 and lens assembly 323. Thus, each lens assembly is rotatable within its fixed support tube but is firmly and precisely held in axial position by being resiliently pressed against the lens positioning stops formed by the shields 325, 326 respectively.

Bottom wall 12 of the viewer case carries a pair of fixed downwardly extending T-shaped legs 330, 332 having horizontal flanges 334, 336 that will readily support the entire viewer upon a suitable surface. In some situations house current may not be available so that the transformer power supply cannot be used. For such situations there is provided a combined battery pack and viewer pedestal 340 (FIG. 1) comprising an elongated rectangular battery housing 342 carrying a plurality of batteries (not shown) to provide electrical power to the lamp 111, and having an electrical connecting line (not shown) adapted to be plugged into a receptacle in the viewer case for connecting the battery to the viewer lamp. The battery housing is formed with flat and mutually parallel top and bottom walls so that the battery housing can rest upon a flat supporting surface and the viewer case may rest upon the upper wall of the housing. The upper portion of the battery housing is formed with a pair of blind T-shaped slots, such as slot 344, adapted to mate with and respectively receive the downwardly projecting legs 330, 332 of the viewer case so that when the legs are received in the battery housing slots, the bottom wall of the viewer case rests upon the upper wall of the battery housing and the combined battery case and pedestal is firmly secured in position.

The detachable front frame 18 of the viewer case is detached from the case when the battery housing and pedestal are being attached to or detached from the case. After the battery housing has been assembled to the viewer case, with legs 330, 332 received in the battery housing wall, the frame 18 is replaced upon the viewer case and the rearward edge of its horizontal bottom flange 348 provides a stop that abuts the front wall 350 of the battery housing to prevent accidental removabl of the battery housing and pedestal from the viewer case.

The described viewer is readily portable, particularly with the movable back and end walls in collapsed condition. To use the viewer, the viewer case is supported upon a suitable horizontal or nearly horizontal surface, or upon the battery housing and pedestal, which itself is supported on such a surface. Pin 86 which projects above the top wall 10 is moved along the slot 88 to the position illustrated in FIG. 1, thereby swinging movable mirror walls 64 and 70 outwardly to operative position.

A microform, of which portions are to be projected, such as a 4"×6" microfiche sheet, a strip of roll film, or an aperture card, or the like, is inserted into the forwardly facing opening of transporter frame guide 128 until it abuts the forward rollers 130, 132. If the forward edge of the film is properly cut, that is, at 90 degrees to the direction of the film transport, the film aligns itself relative to the rollers. Then the operator turns the knob 168 rearwardly (in a counterclockwise direction as viewed from the knob end of the viewer) to draw the film between the rollers of the forward roller pair. This forces the film between the glass flats and to and between the rollers of the rear roller pair, both roller pairs being driven in unison by turning of knob 168. The knob 168 is rotated until a particular column or vertical portion of the film is projected on the screen 38 and then the transporter shifting knob 172 is operated to move the transporter, and thus the entire film, upwardly or downwardly to obtain projection of a selected horizontal film area or a film row. A particular horizontal row being projected is displayed by indicia showing on index tab 180 within the window recess 182.

For column or horizontal position indexing, the microform is inserted and column selection knob 168 rotated until the first column or vertical portion of the film is projected and visible upon the screen 38. It is then known that the film is positioned at a given column, such as column 1, for example. Then column index knob 30 is pulled (or tilted as previously described) and rotated until the desired number, such as number 1 for example, appears on the wheel 32 within the column index window 31. Where the microform has smaller, more closely spaced images, the lens of greater magnification will be used and the outer row 183 of indicia on the index wheel 32 is employed. If the microform being viewed has relatively larger images with greater mutual spacing, the inner row 185 of display characters (having less characters and greater spacing between characters as compared to the characters of row 183) is employed. Preferably the characters of the two rows are printed in different colors or otherwise readily distinguished, since both rows are simultaneously visible through the window. The form of column indexing described above does not depend for accuracy upon the width of initial margins of the microform being used since the indexing display can be set to zero, or any other selected index display character, while an image is actually being viewed, thereby positively and precisely indexing the display. It is not necessary as in prior devices to zero or index the display prior to insertion of the microform being viewed.

Figure 4:
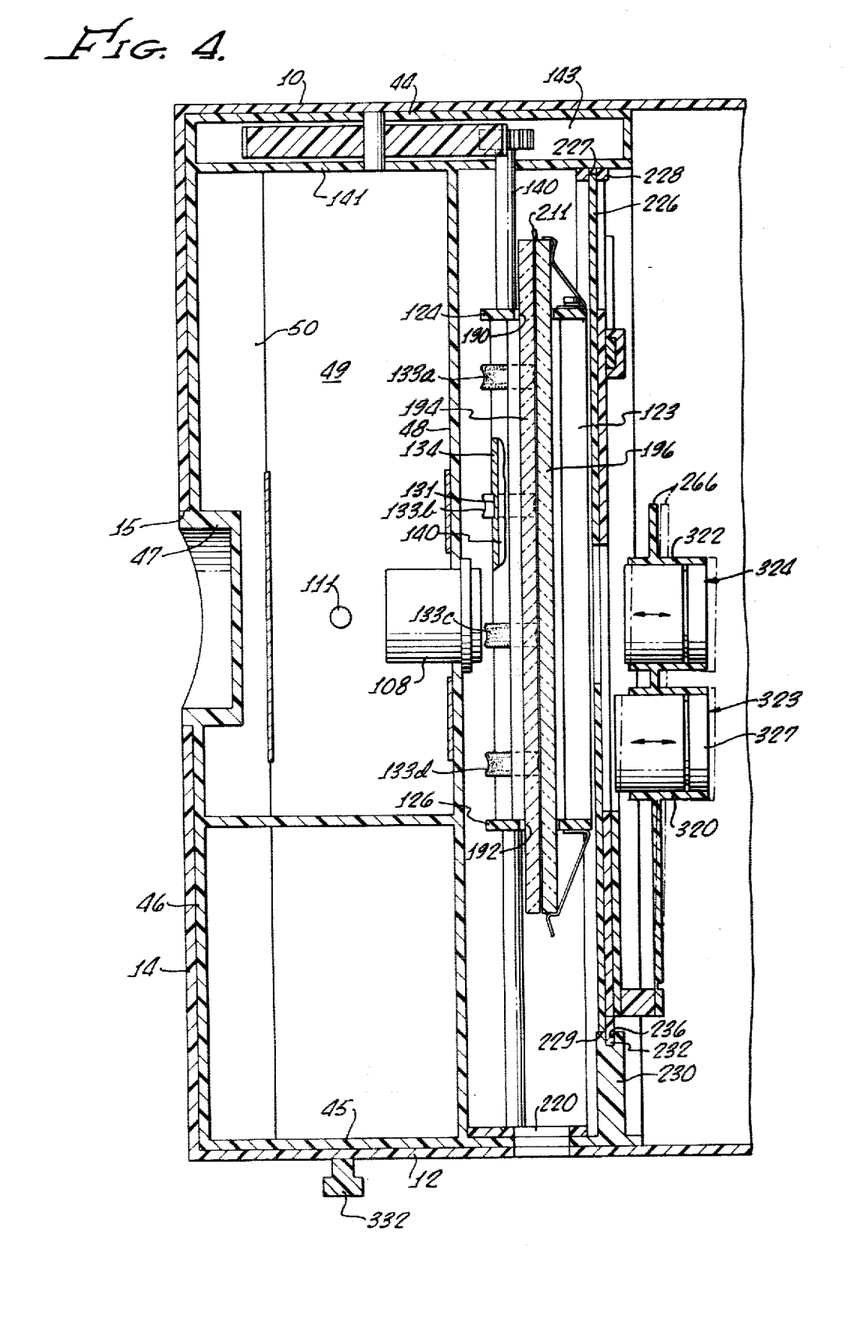
FIG. 4 is a section of a viewer taken on lines 4—4 of FIG. 3.

Light from lamp 111 is collimated by lens 108 and directed through the glass flats 194, 196 and, of course, through the film interposed therebetween. With the lens change shift plate in its lower position, as illustrated in FIGS. 1 and 4, an image of the illuminated portion of the film between the glass flats is projected by lens 324 along the optical path indicated by the arrows in FIG. 3, first striking mirror 92 from which it is reflected to mirror 90 which reflects the image to screen 38. It will be readily appreciated that the system may be employed to project images upon a surface external to the viewer itself if deemed necessary or desirable. The control unit may be removed from the viewer case for such operation.

Focusing of the image upon the screen is readily achieved by turning thumb wheel 27 which rotates bolt 280 and thus swings the movable section 266 of the lens focus plate about its integral hinge 270. It will be readily appreciated that the described pivotal focusing arrangement may be replaced, if deemed necessary or desirable, by some other arrangement that enables an adjustable mounting of the two lenses to move axially of the lenses relative to the lens change shift plate. In such an arrangement the lenses would be mounted to the lens change shift plate for linear or pure translational motion. However, it is found that the angular change of lens axes relative to the screen and to the image, which is produced by the pivotal focusing arrangement illustrated herein, introduces negligible distortion or error and is satisfactory for most applications of this portable viewer. The described integral hinge focusing arrangement is simple, reliable, inexpensive, and highly convenient.

To change the degree of magnification and the area of illuminated film that is projected, the operator simply grasps both of the elements 306 and 288, pressing these toward one another. Only lever arm 288 will move since element 306 is fixed and the lever arm 288 is pivoted. Lever arm 288, when pressed toward the wheel 27, will abut the wheel which thus limits its motion in this direction. Thus, the operator has a firm grasp on elements fixed in position when these are squeezed toward each other. The entire shiftable lens assembly may then be lifted vertically along the slot 26 with edges of the shift plate 252 sliding along guides 232, 234 and followers 246, 248 and 250 sliding upwardly in slots 240, 242 and 244 of the support plate until the upper position is reached. In upper position, release of the lever arm 288 causes latch 294 to engage the upper end of the stop 304 to hold the shiftable assembly in its upper position wherein the lowermost of the two lenses, lens 323, is now positioned in alignment with the axis of light projected through the lens 108 and the interposed film. In the lower position of the lens assembly, with lens 324 in alignment with the lens 108, the bottom edge of the shift plate abuts the upper edge of rib 230 to precisely position the entire shiftable lens assembly.

The indexing arrangement of window 182 and strip 180 operates for both of the lenses, as does the column indexing of window 31 and wheel 32. Whichever of the lenses is in position, the indexing displays will indicate the vertical position of the horizontal area of the film and the horizontal position of a vertical area.

The arrangement provides a film path within the case that is only slightly longer than the length of the transporter assembly (along the film path) itself. This path may be even shorter if the exit aperture of the film were provided in the rear case wall 60. However, for convenience of operation and easy access to and by the operator, the transporter is provided with the film deflector 129 to provide a right angle bend in the film path which causes the film to exit through slot 41 in the end wall 40 of the viewer, closely adjacent but to the rear of the operating hand of the operator. This short film path minimizes film feed problems and decreases chances of the film (particularly a short length) being lost or misrouted or stuck within inaccessible portions of the interior of the viewer case. The simple short path of the described transport greatly facilitates the use of many different types of film and other flexible transparent viewing media. Further, since the film exits the viewer adjacent operating knobs 168, 172, it is more readily retrieved by the operator.

The foregoing detailed description is to be clearly understood as given by way of illustration and example only, the spirit and scope of this invention being limited solely by the appended claims.

I claim:

1. A microform viewer comprising
   a case,
   a film transporter mounted in said case for guiding therethrough film bearing an image to be projected,
   means for illuminating film in said transporter, and
   a lens system for projecting an image of said illuminated film, said lens system comprising
   a lens carrier support plate mounted to said case,
   a lens focus plate having a fixed portion attached to said support plate, having a movable portion, and having a relieved hinge portion integrally connecting said fixed and movable portions to one another to permit pivotal motion of said movable focus plate portion relative to said fixed portion,
   a lens carried by said movable portion, and
   focus control means for selectively and adjustably positioning said movable portion relative to said fixed portion so as to selectively focus said lens.

2. The viewer of claim 1 including a shift plate, means for slidably mounting said shift plate to said support plate, said fixed portion of said lens focus plate being fixedly secured to said shift plate whereby said focus plate and said lens are shiftable relative to said support plate, and a second lens carried on said movable portion of said focus plate and spaced from said first-mentioned lens in the direction of relative motion of said support plate and shift plate.

3. The viewer of claim 2 wherein said means for positioning comprises a shaft rotatably captured in one of said plates and threaded in the other of said plates, and a focus control means fixed to said shaft for focusing both said lenses.

4. The viewer of claim 2 including latching means having mutually cooperating parts carried by said support and shift plates for selectively latching said shift plate in a chosen position with respect to said support plate, said latching means comprising a latch tongue slidably mounted on said shift plate, a bell crank pivoted to said shift plate and engaged with said latch tongue, and a stop fixed to said support plate for engaging said tongue at two positions of said shift plate.

5. The viewer of claim 2 wherein said means for slidably mounting said shift plate to said support plate comprises a plurality of spaced guides on one of said support and shift plates and a plurality of guide followers on the other of said support and shift plates respectively cooperating with said guides to slidably retain and guide said shift plate to and along said support plate.

6. The viewer of claim 2 wherein said means for adjustably positioning said movable portion comprises a headed shaft captured in one of said focus and shift plates and threadedly engaged in the other, and a focusing wheel fixed to said shaft and interposed between said focus and shift plates.

7. The viewer of claim 2 wherein said film transporter comprises a transporter frame, a pair of opposed rollers in said frame for receiving and driving film positioned therebetween, a concentric shaft assembly mounted in said case, and means responsive to said concentric shaft assembly for selectively and independently rotating at least one of said rollers and driving said film transporter relative to said case.

8. The viewer of claim 2 wherein said transporter comprises a transporter frame mounted to said case, and a pair of closely spaced mutually opposed transparent elongated flat plates adapted to receive and position film with respect to said lens system, means for driving said film through and between said plates, said flat plates being detachably mounted to and within said transporter frame and hingedly connected to each other at one end of one of said flat plates.

9. The viewer of claim 2 wherein said means for illuminating film comprises an electric lamp mounted in said case, and a battery pack detachably connected to said lamp to provide a source of electrical power therefor, said case including a bottom wall, and said battery pack comprising a battery housing extending along a major portion of the length of said bottom wall, said battery housing comprising a pedestal supporting said case and its contents and means for detachably connecting said battery housing to said bottom wall.

10. In a portable microform viewer having a case, a film transporter, means for illuminating a portion of said film in said transporter and a lens system for projecting an image of illuminated film, an improved lens system comprising
   a support plate mounted to said case,
   a lens carrier assembly slidably mounted to said support plate, said assembly including
      a plurality of lenses spaced from one another in the direction of relative motion of said lens carrier assembly and said support plate,
      means for adjustably positioning said lens carrier assembly to selectively position a chosen one of said lenses for projection of an illuminated portion of said film,
   said lens carrier assembly including a lens change shift plate having said lenses connected thereto, one of said plates having a plurality of spaced guides and the other of said plates having a plurality of spaced guide followers mating with said guides to detachably and slidably mount said shift plate to said support plate, and
   a lens focus plate movably connected to said shift plate, said lenses being mounted to said focus plate, and means for moving said focus plate relative to said shift plate to effect focusing of a projected image.

11. The apparatus of claim 10 wherein said focus plate comprises an integral plate having a first portion fixed to said shift plate and a second portion connected to said first portion by an integral hinge portion, said lenses being mounted upon said second portion, and means for adjustably pivoting said second portion about its pivotal connected to said first portion.

12. The apparatus of claim 10 wherein said transporter comprises a transporter frame, a pair of opposed rollers in said frame for receiving and driving film positioned therebetween, a concentric shaft assembly mounted in said case, means responsive to said concentric shaft assembly for selectively and independently rotating at least one of said rollers and driving said film transporter relative to said case, a roller shaft journalled in said case, said one roller being mounted upon said shaft for slidable motion along said shaft and for rotation therewith, said concentric shaft assembly and said means for selectively and independently rotating said one roller and driving said transporter comprising a first drive shaft, means connected with said first drive shaft for driving said transporter and said one roller along said one roller shaft, a second drive shaft concentric with said first drive shaft, and means responsive to said second drive shaft for rotating said one roller shaft.

13. The apparatus of claim 10 wherein said transporter comprises a transporter frame mounted to said case, and a pair of closely spaced mutually opposed transparent elongated flat plates adapted to receive and position film with respect to said lens system, said flat plates being detachably mounted to and within said transporter frame, said flat plates being slidably mounted to and within said transporter frame and hingedly connected to each other at one end of one of said flat plates.

14. A microform viewer comprising
   a case,
   a film transporter mounted in said case for guiding therethrough film bearing an image to be projected,
   means for illuminating film in said transporter, and
   a lens system for projecting an image of said illuminated film, said film transporter comprising
      a transporter frame mounted to said case,
      a pair of closely spaced mutually opposed elongated transparent flat plates adapted to slidably receive and position film moving therebetween with respect to said lens system, said plates being detachably mounted to and within said transporter frame, said plates being hingedly connected to one another at one end of one of said plates,
      spacer means interposed between said plates to maintain a minimum spacing therebetween, and
      resilient means for pressing one of said plates against the other and thereby pressing both plates against said frame to hold both plates in position relative to each other and relative to the transporter frame, whereby said plates may be withdrawn from said frame as a unit and pivotally separated for cleaning.

15. The viewer of claim 14 wherein said plates are hingedly connected to one another by a thin flexible hinge strip having one portion attached to one end of an inner surface of one of said plates and another portion attached to an inner surface of the other of said plates, whereby said plates are pivotally connected to each other about an axis transverse to the longitudinal extent thereof and may be transversely moved relative to each other to accommodate film forms of different thickness.

16. The viewer of claim 14 including a first pair of mutually opposed and closely spaced rollers mounted to said transporter frame adjacent one pair of edges of said transparent flat plates for guiding film at one side of said transporter frame to and between said plates, and a second pair of mutually opposed and closely spaced rollers mounted to said frame adjacent opposite edges of said flat plates for receiving and guiding film at the other side of said transporter frame, first and second coaxial drive shafts, means responsive to said first drive shaft for rotating at least one of said rollers, and means responsive to said second drive shaft for driving said transporter frame along the axis of said rollers.

17. The microform viewer of claim 14 wherein the hinged connection of said plates includes means for permitting motion of the plates through different parallel positions relative to one another to vary the spacing therebetween so as to accommodate image bearing film forms of different thickness.

18. The microform viewer of claim 14 wherein said plates are hingedly connected to one another by means of a thin flexible strip having an extended loop that permits expansion of the space between the plates at said one end, said loop having an unsecured length greater than the minimum spacing between said plates.

19. A microform viewer comprising
   a case,
   a film transporter mounted in said case for guiding therethrough film bearing an image to be projected,
   means for illuminating film in said transporter, and
   a lens system for projecting an image of said illuminated film, said transporter comprising
      a transporter frame, a pair of opposed rollers in said frame for receiving and driving film positioned therebetween, a concentric shaft assembly mounted in said case, and means responsive to said concentric shaft assembly for selectively and independently rotating at least one of said rollers and driving said film transporter relative to said case, a roller shaft journalled in said case, said one roller being mounted upon said shaft for slidable motion along said shaft and for rotation therewith, said concentric shaft assembly and said means for selectively and independently rotating said one roller and driving said transporter comprising a first drive shaft and means connected with said first drive shaft for driving said transporter and said one roller along said roller shaft, a second drive shaft concentric with said first drive shaft, and means responsive to said second drive shaft for rotating said roller shaft, said lens system comprising a support plate mounted to said case, a lens carrier assembly slidably mounted to said support plate, said assembly including a plurality of lenses spaced from one another in the direction of relative motion of said lens carrier assembly and said support plate, means for adjustably positioning said lens carrier assembly to selectively position a chosen one of said lenses for projection of an illuminated portion of said film, said lens carrier assembly including a lens change shift plate, one of said plates having a plurality of spaced guides and the other of said plates having a plurality of spaced guide followers mating with said guides to detachably and slidably mount said shift plate to said support plate, a lens focus plate movably connected to said shift plate, said lenses being mounted to said focus plate, and means for moving said focus plate relative to said shift plate to effect focusing of a projected image.

20. A microform viewer comprising a case, a film transporter mounted in said case for guiding therethrough film bearing an image to be projected, means for illuminating film in said transporter, and a lens system for projecting an image of said illuminated film, said means for illuminating film comprising an electric lamp mounted in said case, and a battery pack detachably connected to said lamp to provide a source of electrical power therefor, said case including a bottom wall, and said battery pack comprising a battery housing extending along a major portion of the length of said bottom wall, said battery housing comprising a pedestal supporting said case and its contents, and means for detachably connecting said battery housing to said bottom wall, said battery housing including a top wall and said means for detachably connecting said battery housing to said bottom wall comprising a pair of outwardly projecting flanged guides on one of said walls and a pair of mating slots on the other of said walls, said slots receiving said guides and holding said walls in close proximity to one another.

21. A microform viewer comprising a case, a film transporter mounted in said case for guiding therethrough film bearing an image to be projected, means for illuminating film in said transporter, and a lens system for projecting an image of said illuminated film, said means for illuminating film comprising an electric lamp mounted in said case, and a battery pack detachably connected to said lamp to provide a source of electrical power therefor, said case including a bottom wall, and said battery pack comprising a battery housing extending along a major portion of the length of said bottom wall, said battery housing comprising a pedestal supporting said case and its contents, and means for detachably connecting said battery housing to said bottom wall, said case comprising a detachable front frame, said frame including a lower edge engaging said battery housing to restrain detachment of said battery housing from said case.

22. A microform viewer comprising a case, a film transporter mounted in said case for guiding therethrough a microform bearing an image to be projected, means for illuminating a microform in said transporter, and a lens system for projecting an image of said illuminated film, said film transporter comprising a transporter frame mounted to said case, and a pair of closely spaced, mutually opposed, transparent plates adapted to receive and position a microform with respect to said lens system, flexible and expansible hinge means connecting said plates to one another at one end of each, means for spacing said plates from one another to form a minimum microform receiving space, and means for resiliently urging said plates toward one another and against said frame, whereby a microform of relatively small thickness may be received and guided between said plates in said minimum space and whereby said plates may be displaced from one another to increase the space therebetween and to permit reception and guiding of a microform of relatively greater thickness.

23. The viewer of claim 22 wherein said hinge means comprises a flexible strip connected to said plate ends, said strip having a length between said plates greater than said minimum microform receiving space.

24. A microform viewer comprising a case, a film transporter mounted in said case for guiding therethrough film bearing an image to be projected, means for illuminating film in said transporter, and a lens system for projecting an image of said illuminated film, said lens system comprising a lens carrier support plate mounted to said case, a lens focus plate movably connected to said support plate, a lens support carried by said focus plate, a lens having a sleeve shiftably received in said lens support, a stop fixedly mounted relative to said focus plate, means for urging said lens sleeve relative to said lens support toward said stop, to maintain the lens in axially fixed position relative to said focus plate, and means for focusing said lens comprising
means for adjustably moving said focus plate toward and away from said support plate.

25. The viewer of claim 24 wherein said lens support comprises a support tube, and wherein said stop comprises a light shield segment fixed to an end of said support tube and positioned to partially block light projected through said lens.

26. The viewer of claim 24 wherein said means for urging said lens sleeve toward said stop comprises a cam surface on said sleeve, and means on said lens focus plate for pressing against said cam surface to urge said lens sleeve against said stop.

27. A microform viewer comprising
a case,
a film transporter mounted in said case for guiding therethrough film bearing an image to be projected,
means for illuminating film in said transporter, and
a lens system for projecting an image of said illuminated film, said lens system comprising
a lens carrier support plate mounted to said case,
a lens focus plate movably connected to said support plate,
means for adjustably positioning said focus plate relative to said support plate,
a lens support carried by said focus plate,
a lens having a sleeve shiftably received in said lens support,
a stop fixedly mounted relative to said focus plate, and
means for urging said lens sleeve toward said stop, said means comprising
a cam surface on said sleeve, and means on said lens focus plate for pressing against said cam surface to urge said lens sleeve against said stop, said cam surface comprising,
a circumferential groove formed in said lens sleeve, said groove having said cam surface formed as one wall of said groove, said one wall being inclined radially outardly and axially of said sleeve, said means for pressing against said cam surface comprising a spring carried by said focus plate and having an arm engaging said inclined surface.

28. The viewer of claim 27 including a second lens support carried by said focus plate, a second lens sleeve having a second lens mounted therein, said second lens sleeve being shiftably received in said second lens support, a second stop fixed to said second support, and means for urging said second lens sleeve against said second stop.

29. A microform viewer comprising
a case,
a film transporter mounted in said case for guiding therethrough film bearing an image to be projected,
means for illuminating film in said transporter, and
a lens system for projecting an image of said illuminated film, said lens system comprising
a lens carrier support plate shiftably mounted to said case,
a lens focus plate movably connected to said support plate,
focus control means for adjustably moving said focus plate toward and away from said support plate so as to focus lenses carried by said focus plate,
first and second lens supports fixed to said focus plate, each having a lens stop,
first and second lens bearing sleeves shiftably mounted to said first and second supports respectively, and
means for urging said lens sleeves against said stops.

30. A microform viewer comprising
a case,
a film transporter mounted in said case for guiding therethrough film bearing an image to be projected,
means for illuminating film in said transporter, and
a lens system for projecting an image of said illuminating film, said lens system comprising
a lens carrier support plate shiftably mounted to said case,
a lens focus plate movably connected to said support plate,
focus control means for adjustably positioning said focus plate relative to said support plate,
first and second lens supports fixed to said focus plate, each having a lens stop,
first and second lens bearing sleeves shiftably mounted to said first and second supports respectively, and
means for urging said lens sleeves against said stops, each said lens sleeve being formed with an outwardly facing cam surface that inclines forwardly and radially outwardly of the sleeve, each said lens support including an opening therethrough adjacent the associated sleeve cam surface, and said means for urging said sleeves comprising spring means on said focus plate, said spring means including a first spring arm extending through the opening of said first support into engagement with the cam surface of said first lens sleeve to urge said first lens sleeve against one of said stops, said spring means also including a second arm extending through the opening in said second support into engagement with the cam surface of said second lens sleeve to urge said second lens sleeve against the other of said stops, whereby said lens sleeves are firmly and accurately positioned relative to said focus plate.

31. In combination,
a lens support,
a stop fixed to said lens support,
a lens sleeve shiftably mounted to said support and having a lens mounted therein, said sleeve having an outwardly facing inclined surface, and
means for pressing against said surface to urge said lens sleeve against said stop, thereby to firmly position said lens sleeve relative to said lens support, said lens sleeve being formed with a circumferentially extending, outwardly facing groove, one of the walls of said groove being inclined forwardly and radially outwardly to form said outwardly facing inclined surface, said means for pressing against said surface comprising a resilient member extending through said support into engagement with said inclined surface, said support comprising a first tube, and including a second tube fixed relative to said first tube, a second stop fixed to said second tube and projecting inwardly thereof, a second lens sleeve having a lens mounted therein and being slidably received within said second tube, said second sleeve having an outwardly facing cam surface formed thereon, and means for pressing against said cam surface of said second lens sleeve to urge said second lens sleeve against said second stop.

32. A microform viewer comprising a case, a film transporter mounted in said case for guiding therethrough film bearing an image to be projected, means for illuminating film in said transporter, a lens system for projecting an image of said illuminated film, said transporter comprising a transporter frame and film drive means for moving film through said transporter frame, an index member connected to be shifted by said film drive means to indicate position of the film and an image thereon as the film moves through the transporter frame, means for selectively disengaging said index member from said film drive means, and means for shifting said index member independently of said film drive means whereby said index member can be shifted to indicate a portion of film already in the transporter and can be shifted while an image is projected by said lens system.

33. The viewer of claim 32 wherein said film drive means includes a drive shaft having an index gear thereon, said index member comprising a rotatably mounted index wheel having a set of teeth engaged with said index gear, means for shifting said wheel to disengage said teeth from said index gear, means for urging said teeth into engagement with said index gear, and means for manually rotating said wheel.

34. A microform viewer comprising a case, a film transporter mounted in said case for guiding therethrough film bearing an image to be projected, means for illuminating film in said transporter, a lens system for projecting an image of said illuminating film, said transporter comprising a transporter frame and film drive means for moving film through said transporter frame, an index member connected to be shifted by said film drive means to indicate position of the film and an image thereon as the film moves through the transporter frame, means for selectively disengaging said index member from said film drive means, and means for shifting said index member independently of said film drive means, said lens system including a shiftable lens support movably mounted in said case and first and second lens systems, means for mounting said lens systems to said shiftable lens support, said lens support being shiftable so as to selectively position one or the other of said lens systems to project an image of said illuminated film, said index member having first and second arrays of indexing indicia, whereby film may be inserted in said viewer and indexed by projecting an image of said film and thereafter moving said index member independently of said film drive means to display indicia representative of the image projected.

35. The viewer of claim 34 wherein said film drive means comprises a drive shaft, an index drive gear mounted on said shaft, said index member comprising an index wheel and means for mounting said index wheel for selective manual engagement and disengagement with said index drive gear, and means for manually rotating said index wheel.

36. In a portable microform viewer having a case, a film transporter, means for illuminating a portion of said film in said transporter and a lens system for projecting an image of illuminated film, an improved lens system comprising a support plate mounted to said case, a lens carrier assembly slidably mounted to said support plate, said assembly including
a lens change shift plate slidably mounted in said support plate,
a lens focus plate pivoted to said shift plate,
a plurality of lenses mounted to said focus plate and spaced from one another in the direction of relative motion of said lens change shift plate and said support plate,
means for adjustably positioning said lens change shift plate to selectively position a chosen one of said lenses for projection of an illuminated portion of said film, and
means for moving said focus plate relative to said shift plate to effect focusing of a projected image.

37. A microform viewer comprising a case, a film transporter mounted in said case for guiding therethrough film bearing an image to be projected, means for illuminating film in said transporter, a lens system having first and second lenses for projecting an image of the illuminated film through one or the other of said lenses, said transporter comprising a transporter frame and film drive means for moving film through said transporter frame, an index member connected to be shifted by said film drive means to indicate position of the film and an image thereon as the film moves through the transporter frame, said index member having first and second arrays of indexing indicia corresponding respectively to said first and second lenses, and means for shifting said index member independently of said film drive means.

* * * * *